Sept. 29, 1925.
C. C. HANSEN
DOUBLE DRUM HOIST
Filed March 18, 1924
1,555,248
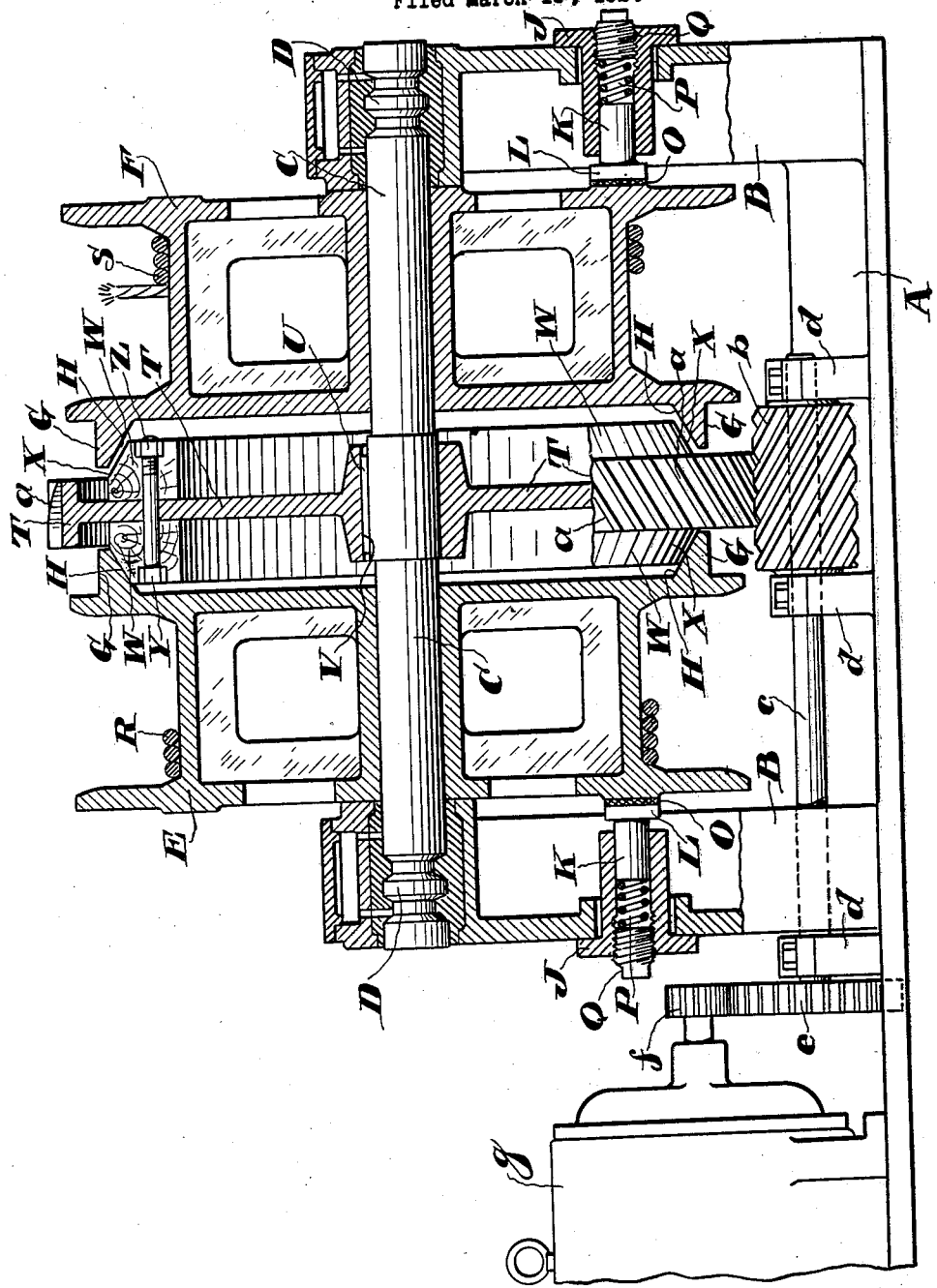
INVENTOR
Charles C. Hansen
BY
Herbert E. Ogden
HIS ATTORNEY Patented Sept. 29, 1925.

1,555,248

UNITED STATES PATENT OFFICE.

CHARLES C. HANSEN, OF EASTON, PENNSYLVANIA. ASSIGNOR TO INGERSOLL-RAND COMPANY, OF JERSEY CITY, NEW JERSEY. A CORPORATION OF NEW JERSEY.

DOUBLE-DRUM HOIST.

Application filed March 18, 1924. Serial No. 699,971.

*To all whom it may concern:*

Be it known that I, CHARLES C. HANSEN, a citizen of the United States, and a resident of Easton, county of Northampton, and State of Pennsylvania, have invented a certain Double-Drum Hoist, of which the following is a specification accompanied by drawings.

This invention relates to hoists, but more particularly to an improved clutch mechanism for a double drum hoist in which two positively connected members cooperate to move the main driver into frictional engagement with one or the other of the drums in accordance with the direction of rotation of the prime mover.

The objects of this invention are to produce a simple and improved clutch mechanism for a double drum hoist to enable one or the other of the drums to be frictionally engaged by a positively actuated member in order to drive one or the other of the drums in accordance with the direction of rotation of the motor.

Further objects of the invention will hereinafter appear and the invention is shown in one of its preferred forms in the accompanying drawings, in which the figure is a longitudinal sectional elevation of a double drum hoist.

Referring to the drawings, A designates the base plate of the hoist and end frames B are mounted in separated relationship on said base plate. A shaft C is preferably mounted in the end frames B and is provided with suitable thrust bearings D at the opposite ends thereof. A pair of drums E and F are in this instance adapted to rotate about the shaft C in relatively fixed longitudinal relationship and are preferably provided with brake flanges G to which suitable brakes (not shown) may be applied. The inner surfaces of the flanges G are cut away at H to form friction surfaces for a purpose hereinafter described.

In order to exert a braking or checking effect on the drums E and F, guide sleeves J are secured in any suitable manner to the end frames B, and plungers K are slidable in the guide sleeves J and are formed with brake shoes L having suitable brake linings O which bear against the drums. Coil springs P are located between the plungers K and screws Q and force the brake linings O against one side of each drum. In this manner, when one of the drums E and F is free to rotate relative to the shaft C, the cable R or S wound about the drums E and F respectively, will not be unwound too rapidly.

A main driver T in this instance in the form of a wheel, is preferably keyed to the shaft C by a suitable key U, on the keyway V, although it is capable of longitudinal movement relative to the drums E and F on the key. Opposed friction rings W having frictional surfaces X are connected to the main driver T by suitable bolts Y and nuts Z. The friction rings W are adapted to frictionally engage the friction surface H on one drum or the other.

In order to move the main driver T to operatively engage one drum or the other, the main driver T is formed with spiralled teeth $a$ and a gear $b$ having teeth oppositely spiralled from the teeth $a$, meshes with the teeth $a$. The spiralled gear $b$ is preferably mounted on a counter shaft $c$ having bearings in the pedestals $d$. A gear $e$ is mounted on the counter shaft $c$ and meshes with a driving pinion $f$ which is driven by a reversible motor $g$. Although an electric motor is shown on the drawing, it is to be understood that any other type of motor may be employed without departing from the spirit of the invention.

The spiralled gear $b$ and the oppositely spiralled teeth $a$ on the main driver T cooperate to move the main driver T longitudinally between the drums E and F according to the direction of rotation of the motor $g$. The spiralled gear $b$ creates a thrust on the teeth $a$ to drive the main driver in one direction or the other so that the friction rings W operatively engage the friction surfaces H on the drum flange G to drive one or the other of the drums. When one of the drums is driven, the other drum is free to rotate about the shaft C and although no brakes have been shown, applied to the flanges G of the drums, it is to be understood that this may be done if desired or necessary.

I claim:

In a double drum hoist the combination of a shaft, two independent drums adapted to rotate about said shaft in relatively fixed longitudinal relationship, a main driver in the form of a spiral gear rotatable between said drums about the same axis but bodily movable longitudinally of the shaft, friction surfaces at each side of said main driver, a spiral driving gear meshing with said main driver, and a reversible motor connected to drive said spiral driving gear, whereby the main driver is automatically actuated by the spiral gears into frictional engagement with one drum or the other in accordance with the direction of rotation of the motor, while permitting the free drum to rotate in either direction as desired.

In testimony whereof I have signed this specification.

CHARLES C. HANSEN.